(12) United States Patent
Zhao et al.

(10) Patent No.: US 8,073,070 B2
(45) Date of Patent: Dec. 6, 2011

(54) MULTI-PILOT GENERATION METHOD AND DETECTION METHOD IN MULTI-ANTENNA COMMUNICATION SYSTEM

(75) Inventors: Zheng Zhao, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 882 days.

(21) Appl. No.: 12/092,944

(22) PCT Filed: Nov. 22, 2006

(86) PCT No.: PCT/JP2006/323363
§ 371 (c)(1),
(2), (4) Date: May 7, 2008

(87) PCT Pub. No.: WO2007/061015
PCT Pub. Date: May 31, 2007

(65) Prior Publication Data
US 2009/0268836 A1 Oct. 29, 2009

(30) Foreign Application Priority Data
Nov. 24, 2005 (CN) .......................... 2005 1 0128636

(51) Int. Cl.
*H04B 7/02* (2006.01)
(52) U.S. Cl. ........ 375/267; 375/260; 375/324; 375/347; 375/299; 375/349; 370/432; 370/442; 370/458; 370/471; 370/491; 455/500; 455/59; 455/61; 455/101; 455/103
(58) Field of Classification Search .................. 375/267, 375/260, 324, 347, 349, 299; 455/500, 59, 455/61, 101, 103; 370/432, 436, 442, 458, 370/471, 478, 482, 491, 500, 527
See application file for complete search history.

(56) References Cited

U.S. PATENT DOCUMENTS

| 2004/0233838 | A1* | 11/2004 | Sudo et al. .................... 370/208 |
| 2005/0163081 | A1 | 7/2005 | Aoki |
| 2005/0163244 | A1 | 7/2005 | Seto |
| 2005/0265472 | A1 | 12/2005 | Takeda |
| 2005/0286651 | A1 | 12/2005 | Egashira |
| 2006/0205437 | A1* | 9/2006 | Sung et al. ................. 455/562.1 |

(Continued)

FOREIGN PATENT DOCUMENTS
JP 2000-196689 7/2000
(Continued)

OTHER PUBLICATIONS
International Search Report dated Feb. 20, 2007.

*Primary Examiner* — Khanh C Tran
*Assistant Examiner* — Rahel Guarino
(74) *Attorney, Agent, or Firm* — Dickinson Wright PLLC

(57) ABSTRACT

Provided are a multi-pilot generation method and a detection method in a multi-antenna communication system. In the method, a transmission side superimposes a first preamble sequence and a third preamble sequence to generate a second preamble sequence, which is subjected to serial/parallel conversion before the first preamble sequence and the second preamble sequence are successively transmitted from a plurality of antennas by time division. A reception side receives the first preamble sequence and the second preamble sequence by a plurality of antennas, separates the third preamble sequence from the second preamble sequence by a spatial division process, and performs a pilot correlation process by using the first preamble sequence and the separated third preamble sequence.

13 Claims, 5 Drawing Sheets

U.S. PATENT DOCUMENTS

2007/0268881 A1 * 11/2007 Moorti et al. ................. 370/338

FOREIGN PATENT DOCUMENTS

| | | |
|---|---|---|
| JP | 2003-304215 | 10/2003 |
| JP | 2004-247985 | 9/2004 |
| JP | 2005-198215 | 7/2005 |
| JP | 2005-210690 | 8/2005 |
| JP | 2005-341442 | 12/2005 |
| JP | 2006-014234 | 1/2006 |
| WO | 2002/041548 | 5/2002 |

* cited by examiner

US 8,073,070 B2

MULTI-PILOT GENERATION METHOD AND DETECTION METHOD IN MULTI-ANTENNA COMMUNICATION SYSTEM

TECHNICAL FIELD

The present invention relates to a multi-pilot generation method and a detection method in a multi-antenna communication system.

BACKGROUND ART

An orthogonal frequency division multiplex (OFDM) system and a MIMO (Multiple Input Multiple Output) are core techniques in future radio communication. Merging an OFDM system with a MIMO system makes it possible to effectively improve frequency spectrum efficiency and simplify the system. In the MIMO system, data is transmitted from a plurality of radio physical channels simultaneously, and so, a preamble sequence is generated in the frequency domain, space domain and time domain simultaneously, and therefore the MIMO system is more complicated than a SISO (Single Input Single Output) system.

In a radio communication system, pilots and training sequences have quite important roles. This radio communication system generates a variety of pilots for channel estimation, timing synchronization and frequency offset estimation (Non-Patent Document 1) and the like, applies different methods for generating their respective preamble sequences and uses channel resources different from each other. To guarantee the accuracy of synchronization, frequency offset and channel estimation, pilots use more resources if preamble sequences and data sequences have the same length. For example, pilot energy is higher than data energy, and so, in the OFDM communication system, a carrier interval of short training sequences is four times the subcarrier interval of normal symbols.

The most part of studies on the MIMO system focus attention on the generation of a preamble sequence when channel estimation is carried out. Those studies are targeted at a MIMO channel environment and determine a scheme of generating a preamble sequence for channel estimation, thereby obtaining an optimum solution for the preamble sequence. On the other hand, to eliminate a frequency offset, a method of eliminating a frequency offset of a SISO system is generally used (Non-Patent Document 2). FIG. 1 shows a pilot configuration in an IEEE802.11 protocol. The frequency offset elimination pilot and the channel estimation pilot use different symbol resources in the IEEE802.11 protocol, so that a long preamble sequence of 8 ms is provided for the channel estimation pilot, and ten short preamble sequences include four training sequences for frequency offset estimation.

Non-Patent Document 1: Richard van Nee, Ramjee Prased "OFDM wireless multimedia communications, Boston, London: Artech House, 2000"

Non-Patent Document 2: IEEE C802.16e-04/192, "Preamble design to improve MIMO support", 2004.6.26

DISCLOSURE OF INVENTION

Problems to be Solved by the Invention

However, the above described MIMO system generates two types of preamble sequence separately, and has to distribute resources to the two pilots respectively, and consequently, has a problem that more resources are thereby required.

It is therefore an object of the present invention to provide a multi-pilot generation method and detection method that save system resources.

Means for Solving the Problem

The multi-pilot generation method in a multi-antenna communication system of the present invention includes steps of generating a first preamble sequence; superimposing a third preamble sequence on the first preamble sequence to generate a second preamble sequence; and converting the first preamble sequence and the second preamble sequence from serial to parallel and sequentially transmitting the first preamble sequence and the second preamble sequence from a plurality of antennas through space division.

The multi-pilot detection method in a multi-antenna communication system of the present invention includes steps of receiving a first preamble sequence transmitted from a plurality of antennas and a second preamble sequence on which the first preamble sequence and a third preamble sequence are superimposed, from a plurality of antennas; and separating the third preamble sequence from the second preamble sequence through space division processing.

ADVANTAGEOUS EFFECT OF THE INVENTION

According to the present invention, system resources can be saved.

BEST MODE FOR CARRYING OUT THE INVENTION

An embodiment of the present invention will be explained below in detail with reference to the accompanying drawings.

Embodiment

Figure 1:
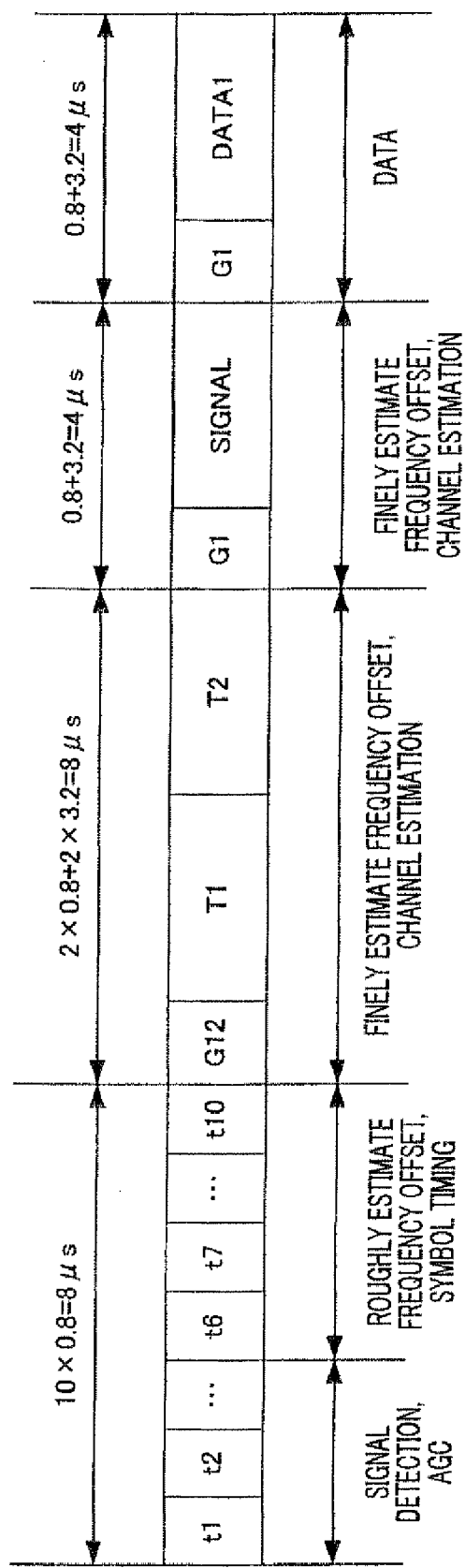
FIG. 1 shows a pilot configuration in an IEEE802.11 protocol.
Figure 2:
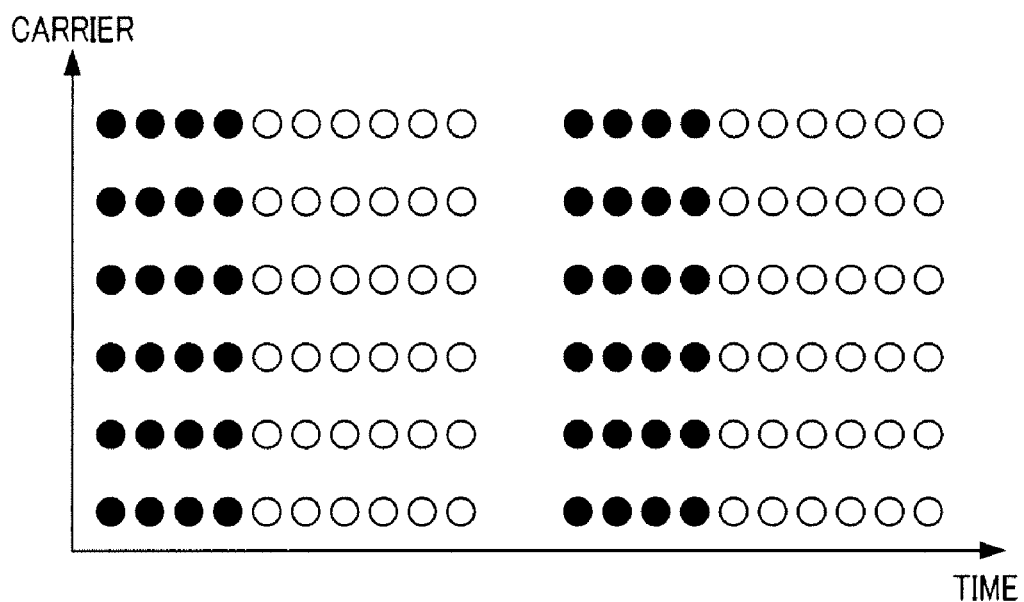
FIG. 2 shows a mapping pattern of pilot signals and data signals.
Figure 3:
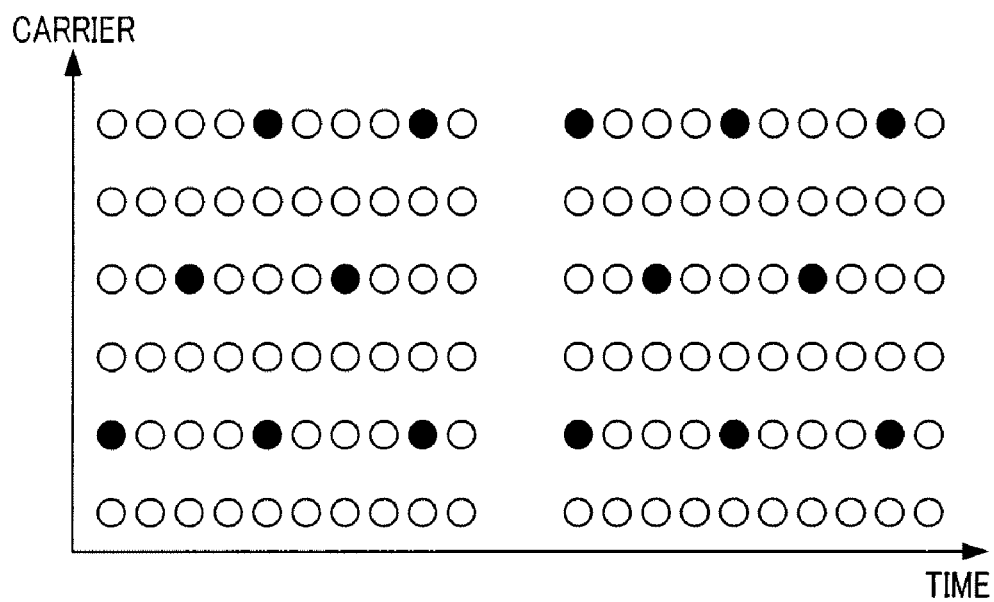
FIG. 3 shows a mapping pattern of pilot signals and data signals.

In an OFDM system, carriers can transmit pilots simultaneously. Further, some carriers may transmit pilot signals and other carriers may transmit data signals. FIG. 2 and FIG. 3 show mapping patterns of pilot signals and data signals. In FIG. 2 and FIG. 3, black-painted circles represent pilot signals and circles represent data signals. The horizontal axis shows the time domain and the vertical axis shows a carrier. FIG. 2 shows a case where all carriers transmit pilot signals or all carriers transmit data signals. FIG. 3 shows a case where pilot signals and data signals are scattered in the time domain and carrier domain, and such a configuration is called a "time-frequency pilot configuration."

A case will be described with the embodiment of the present invention where a multi-antenna communication system is targeted and a plurality of pilots are generated simultaneously based on an IEEE802.11 protocol and 3GPP. In this case, suppose the first preamble sequence is an estimation pilot, that is, a long preamble sequence. The difference from the existing method is not in that the second preamble sequence overlaps the first preamble sequence, but in that the second preamble sequence includes a frequency offset elimination pilot after S/P conversion, that is, a short preamble sequence. Through space-time processing, the receiving side separates the first and second preamble sequences into the channel estimation pilot (long preamble sequence) and the frequency offset elimination pilot (short preamble sequence, that is, third preamble sequence) and performs channel estimation and frequency offset detection using the channel estimation pilot (long preamble sequence) and frequency offset elimination pilot (short preamble sequence).

Figure 4:
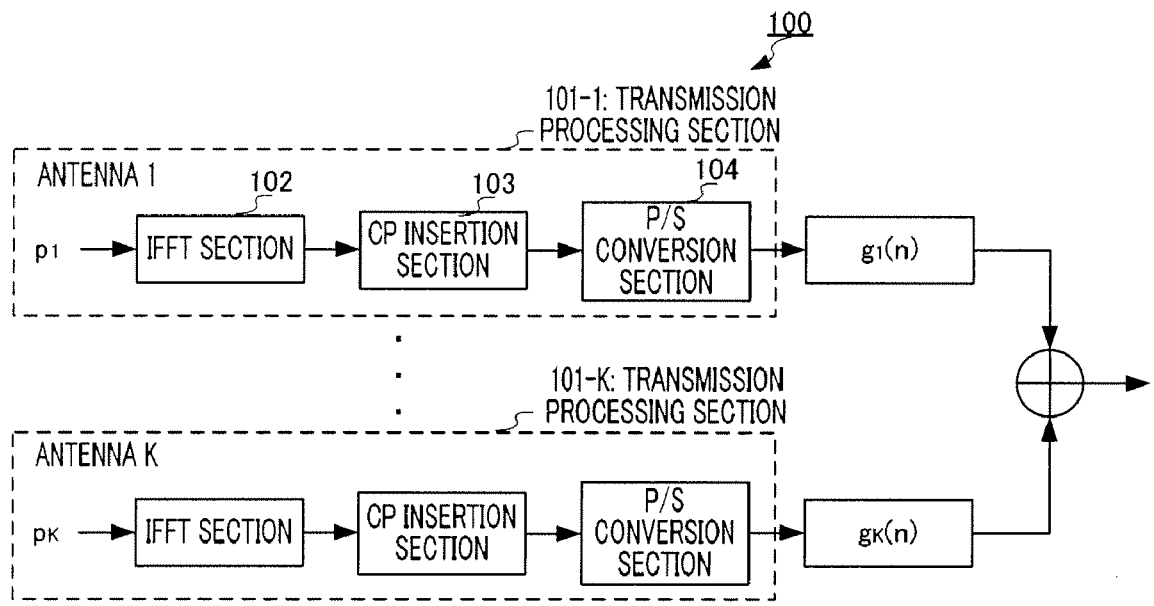
FIG. 4 is a block diagram showing a system model of an OFDM-MIMO transmitting apparatus according to an embodiment of the present invention.

FIG. 4 shows a system model of OFDM-MIMO transmitting apparatus 100 according to the embodiment of the present invention. As shown in FIG. 4, OFDM-MIMO transmitting apparatus 100 has transmission processing sections 101-1 to 101-K on a per antenna basis, and each transmission processing section 101 has IFFT section 102, CP insertion section 103 and P/S conversion section 104. IFFT section 102 applies IFFT (Inverse Fast Fourier Transform) processing to inputted transmission data and outputs the transmission data subjected to the IFFT processing to CP insertion section 103.

CP insertion section 103 inserts a CP (Cyclic Prefix) of length L into the transmission data outputted from IFFT section 102 and outputs the transmission data in which the CP is inserted, to P/S conversion section 104.

P/S conversion section 104 applies P/S (parallel/serial) conversion processing to the transmission data outputted from CP insertion section 103 and transmits the P/S-converted transmission data from the antenna.

Figure 5:
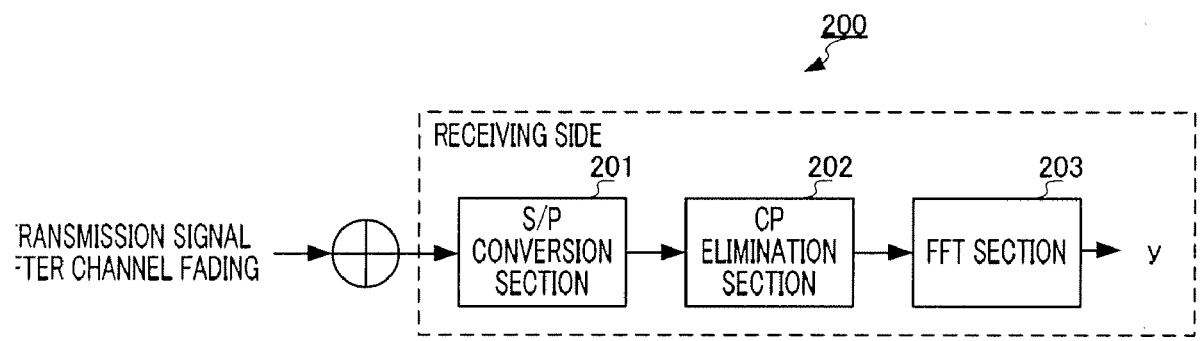
FIG. 5 is a block diagram showing a system model of an OFDM-MIMO receiving apparatus according to the embodiment of the present invention.

FIG. 5 shows a system model of OFDM-MIMO receiving apparatus 200 according to the embodiment of the present invention. As shown in FIG. 5, OFDM-MIMO receiving apparatus 200 receives a signal containing noise transmitted from each antenna of OFDM-MIMO transmitting apparatus 100. Suppose the noise mixed with the received signal is white Gaussian noise.

S/P conversion section 201 receives the signal, applies S/P conversion to the received signal and outputs the received signal subjected to the S/P conversion to CP elimination section 202.

CP elimination section 202 eliminates a CP from the received signal outputted from S/P conversion section 201 and outputs the received signal from which the CP is removed, to FFT section 203.

FFT section 203 applies FFT processing to the received signal outputted from CP elimination section 202, and thereby obtains a received vector in one symbol block.

Generation of pilots in the MIMO system according to the IEEE802.11 protocol will be explained in detail below.

Figure 6:
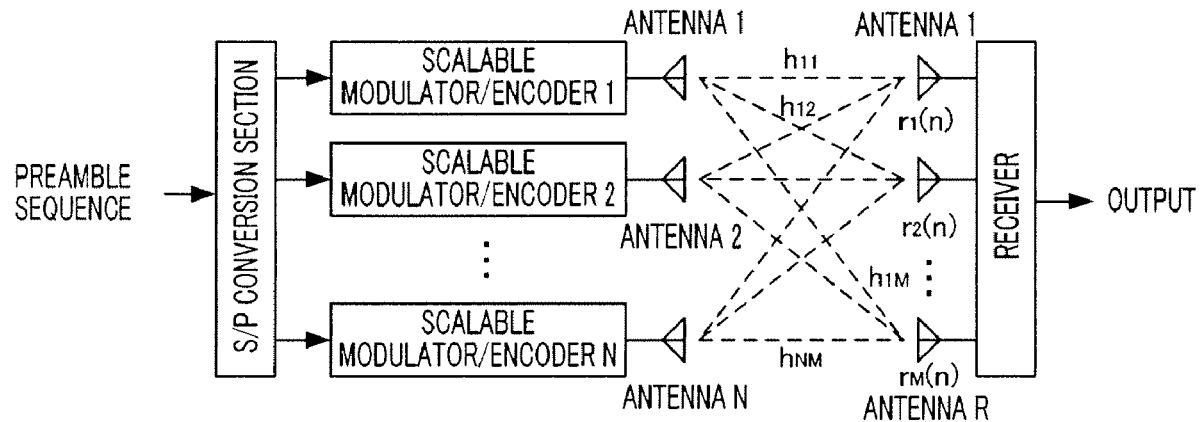
FIG. 6 is a block diagram showing a V-BLAST system model.

As shown in FIG. 6, in a V-BLAST system, a preamble sequence is S/P-converted, scalable modulators/encoders generate preamble sequences of a MIMO system, and the preamble sequences are respectively transmitted from a plurality of antennas.

Figure 7A:
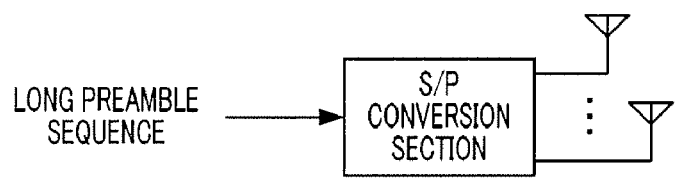
FIG. 7A shows a method of transmitting a first preamble sequence.

The IEEE802.11 protocol provides two preamble sequences to be used for channel estimation. These two preamble sequences are transmitted in an overlapped manner. FIG. 7A shows a method of transmitting a first preamble sequence (long preamble sequence). The long preamble sequence is S/P-converted, transmitted from each antenna and used for channel estimation of the MIMO system. The sequence transmitted from antenna i is represented by following equation 1.

[1]

$$\bar{s}_{Ti} \quad \text{(Equation 1)}$$

Since the system has N transmitting antennas, the received signal is represented by following equation 2.

[2]

$$R = [\bar{s}_{T1}\bar{s}_{Ti} \ldots \bar{s}_{Ti}]H + N_1 = SH + N_1 \quad \text{(Equation 2)}$$

H is channel fading from the transmitting antennas to the receiving antennas, and an element on an i-th row and j-th column shows fading from transmitting antenna to receiving antenna j. $N_1$ is noise received by the receiving antennas, and noise signals received by the respective antennas are independent through zero mean value Gaussian distribution.

The second preamble sequence is formed by superimposing the frequency offset elimination pilot (short preamble sequence, that is, third preamble sequence) on the first preamble sequence (long preamble sequence). Suppose an existing technique is applied to the generation of the frequency offset elimination pilot and the length thereof is in proportion to the number of antennas.

Figure 7B:
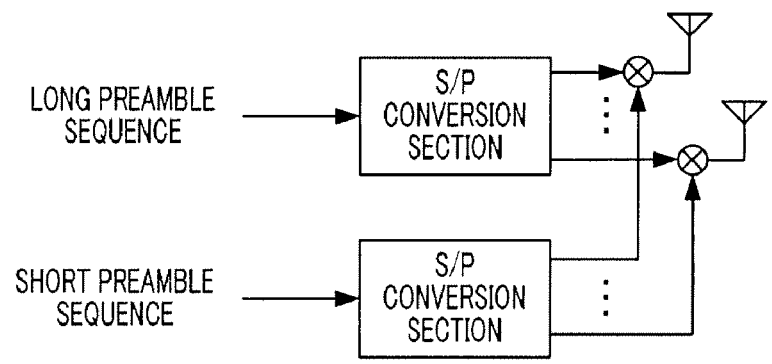
FIG. 7B shows a method of transmitting a second preamble sequence.

FIG. 7B shows a method of transmitting the second preamble sequence. First, the frequency offset elimination preamble sequence (short preamble sequence) ($s_{t1}$, $s_{t2}$, ... and $s_{tN}$) of length N is S/P-converted, and the frequency offset elimination pilot after the S/P conversion is multiplied by the long preamble sequence after the S/P conversion. That is, the third preamble sequence is superimposed on the first preamble sequence (see FIG. 8). In the second preamble sequence, the symbol sequence transmitted from antenna i is represented by following equation 3 and the received signal is represented by equation 4.

[3]

$$\bar{s}'_{Ti} = s_{Ti}\bar{s}_{Ti} \quad \text{(Equation 3)}$$

[4]

$$\tilde{R} = [\bar{s}'_{T1}\bar{s}'_{T2} \ldots \bar{s}'_{TN}]H + N_2 \quad \text{(Equation 4)}$$

Using the transmission symbols of the first preamble sequence and the third preamble sequence, the second preamble sequence can be represented by following equation 5.

[5]

$$\tilde{R} = S\Phi H + N_2 \quad \text{(Equation 5)}$$

Here, $\Phi$ is as shown by equation 6.

[6]

$$\Phi = \begin{bmatrix} s_{t1} & 0 & & 0 \\ 0 & s_{t2} & \ddots & \\ & \ddots & \ddots & 0 \\ 0 & & 0 & s_{tN} \end{bmatrix} \quad \text{(Equation 6)}$$

To obtain diagonal matrix Φ in equation 6, the number of rows of matrix S must be greater than the number of columns. That is, the number of transmitting antennas must be greater than the number of receiving antennas.

A second preamble sequence detection method in the MIMO system according to the IEEE802.11 protocol will be explained below.

As is apparent from equation 2 and equation 5, there is a difference equivalent to one diagonal element between the two. Following equation 7 is obtained by right-multiplying R~ by inverse matrix $R^{-1}$ of R.

[7]

$$Y = \tilde{R}R^{-1} = S\Phi S^{-1} + N \quad \text{(Equation 7)}$$

Channel estimation preamble sequence S (long preamble sequence) is known, so that, by obtaining diagonal matrix Φ from Y, it is possible to separate frequency offset elimination preamble sequence $s_t$ (short preamble sequence). The frequency offset is then estimated using this frequency offset elimination preamble sequence. When channel estimation is carried out using the second preamble sequence, the preamble sequence is corrected to SΦ.

Figure 8:
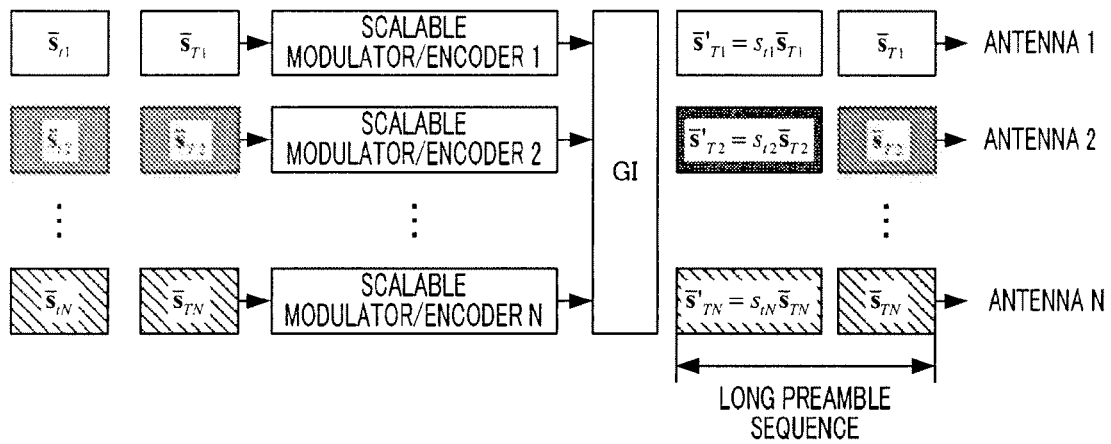
FIG. 8 shows a pilot configuration in a MIMO system according to the embodiment of the present invention.
Figure 9:
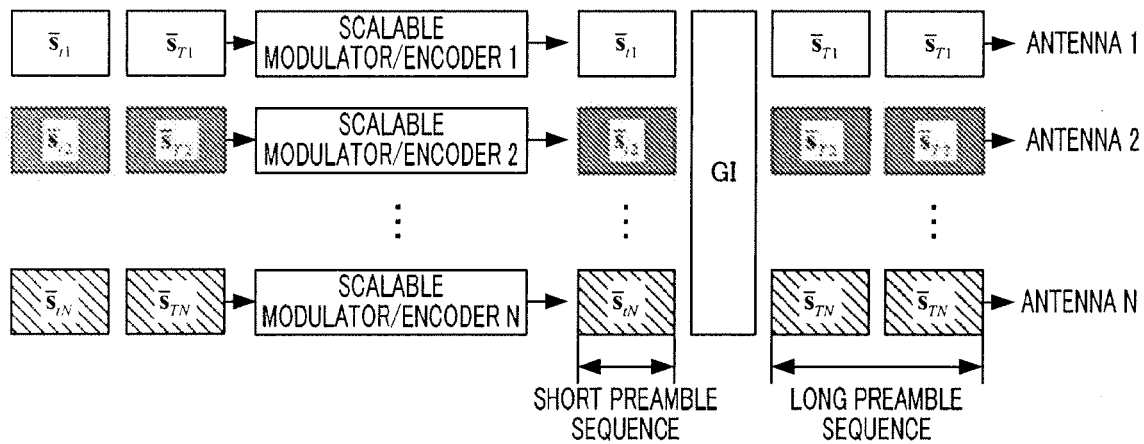
FIG. 9 shows a pilot configuration in an existing MIMO system.
Figure 10:
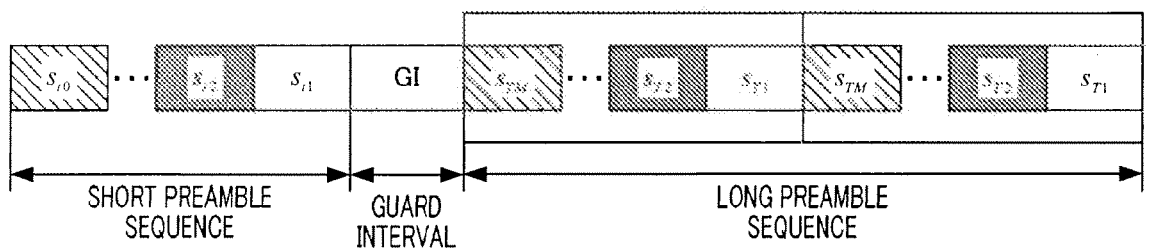
FIG. 10 shows a pilot configuration in a SISO system according to the IEEE802.11 protocol.

Here, to make the principle of the present invention easier to understand, the pilot configuration in the present embodiment shown in FIG. 8 will be compared with the configuration of the preamble sequence in the existing MIMO system shown in FIG. 9. However, both configurations are obtained from the pilot configuration in a SISO system shown in FIG. 10.

The OFDM system roughly estimates a frequency offset using a short preamble sequence. The reason that a long preamble sequence is not used is to expand the range of estimating the frequency offset. As is apparent from a comparison between FIG. 8 and FIG. 9, the length of the short preamble sequence in FIG. 8 is not increased, and therefore the range of estimating the frequency offset is not reduced.

The generation of pilots in the MIMO system based on 3GPP will be explained below.

According to the 3GPP protocol, the most part of the pilot configuration is the time-frequency configuration as shown in FIG. 3. The V-BLAST system improves transmission rates of pilots by using spatial multiplexing. The V-BLAST system makes it possible to transmit preamble sequences in an overlapped manner in the time domain. According to the present embodiment, before the second preamble sequence is transmitted, the S/P-converted frequency offset elimination preamble sequence (short preamble sequence, that is, third preamble sequence) is multiplied by S/P-converted long preamble sequence (first preamble sequence) as in the case of the generation of pilots in the MIMO system according to the IEEE802.11 protocol. That is, the third preamble sequence is superimposed on the first preamble sequence. In the first preamble sequence, the symbol sequence transmitted from antenna i by the j-th carrier is represented by following equation 8.

[8]

$$\bar{s}_{Ti,j} \quad \text{(Equation 8)}$$

For this reason, the symbol sequence transmitted from antenna i in the second preamble sequence is represented by following equation 9, where the carrier is the j-th carrier.

[9]

$$\bar{s}'_{Ti,j} = s_{ti}\bar{s}_{Ti,j} \quad \text{(Equation 9)}$$

The first preamble sequence is Fourier-transformed at the receiving side and the signal received by the j-th carrier is represented by following equation 10.

[10]

$$R_j = [\bar{s}_{T1,j} \bar{s}_{T2,j} \ldots \bar{s}_{TN,j}] H_j + N_1 = S_j H_j + N_{j,1} \quad \text{(Equation 10)}$$

$H_j$ shows fading on subcarrier j from the transmitting antenna to the receiving antenna, the element on the i-th row and k-th column represents fading from transmitting antenna i to receiving antenna k, $N_{j,i}$ is a noise signal on the j-th carrier after a Fourier transform received by the receiving antenna, and noise signals at the respective antennas are independent through zero mean value Gaussian distribution. $S_j$ is a symbol sequence transmitted from each antenna by subcarrier j.

According to the transmission method described above, a signal received with the second preamble sequence is represented by following equation 11.

[11]

$$\tilde{R}_j = [\bar{s}'_{T1,j} \bar{s}'_{T2,j} \ldots \bar{s}'_{TN,j}] H_j + N_{2,j} \quad \text{(Equation 11)}$$

Using the first preamble sequence and the third preamble sequence, the second preamble sequence can be represented by following equation 12, where Φ is equation 13.

[12]

$$\tilde{R}_j = S_j \Phi H_j + N_{2,j} \quad \text{(Equation 12)}$$

[13]

$$\Phi = \begin{bmatrix} s_{t1} & 0 & & 0 \\ 0 & s_{t2} & \ddots & \\ & \ddots & \ddots & 0 \\ 0 & & 0 & s_{tN} \end{bmatrix} \quad \text{(Equation 13)}$$

To obtain diagonal matrix Φ in equation 13, the number of rows of matrix $S_j$ must be greater than the number of columns. That is, the number of transmitting antennas must be greater than the number of receiving antennas.

The second preamble sequence detection method in the MIMO system according to 3GPP will be explained.

As is apparent from equation 10 and equation 12, there is a difference equivalent to one diagonal element between the two preamble sequences and equation 14 is obtained by right-multiplying $\tilde{R}_j$ by inverse matrix $R_j^{-1}$ of $R_j$.

[14]

$$Y = \tilde{R}_j R_j^{-1} = S_j \Phi S_j^{-1} + N \quad \text{(Equation 14)}$$

The use of channel estimation preamble sequence $S_j$ allows diagonal matrix Φ to be obtained from Y, and therefore it is possible to separate frequency offset estimation preamble sequence $S_t$ (third preamble sequence). A frequency offset is then estimated using the separated sequence. Here, when the channel is estimated using the second preamble sequence, the preamble sequence is corrected to $S_j\Phi$.

In this way, based on the pilot generation configuration in the SISO system according to the current OFDM system IEEE802.11 protocol and the 3GPP currently being created, the present embodiment transmits a short preamble sequence and a long preamble sequence simultaneously in a V-BLAST system, and makes a distinction between the short preamble sequence and long preamble sequence using spatial identification functions of multiple antennas of the V-BLAST system, so that it is possible to save radio resources.

Furthermore, unlike the conventional method, the present invention does not overlap the first preamble sequence in the second preamble sequence for channel estimation, makes frequency offset elimination information (third preamble sequence) included in not only the first preamble sequence but also in the second preamble sequence using the spatial characteristic of multiple antennas, and extracts channel estimation pilots and frequency offset elimination pilots from two preamble sequences through space division processing, so that it is possible to reduce the number of pilots and to improve the radio resource use efficiency.

Although a case has been explained with the present embodiment where the first preamble sequence is a long preamble sequence and the third preamble sequence is a short preamble sequence, the present invention is not limited to this, and, for example, the first preamble sequence may be a short preamble sequence and the third preamble sequence may be a long preamble sequence.

The present application is based on Chinese Patent Application No. 200510128636.5, filed on Nov. 24, 2005, the entire content of the specification, drawings and abstract of which is expressly incorporated by reference herein.

INDUSTRIAL APPLICABILITY

The multi-pilot generation method and the detection method in a multi-antenna communication system according to the present invention are applicable to a high-speed radio communication system and a radio local network system with a high amount of throughput in various cellular schemes, and is especially applicable to pilots in an OFDM-MIMO system, for example, generation of pilots according to the IEEE802.11 protocol adopting multiple antennas.

The invention claimed is:

1. A multi-pilot generation method in a multi-antenna communication system, comprising the steps of:
generating a first preamble sequence;
superimposing the first preamble sequence and a third preamble sequence to generate a second preamble sequence; and
converting the first preamble sequence and the second preamble sequence from serial to parallel and sequentially transmitting the first preamble sequence and the second preamble sequence from a plurality of antennas through space division.

2. The multi-pilot generation method in a multi-antenna communication system according to claim 1, wherein the first preamble sequence is a long preamble sequence.

3. The multi-pilot generation method in a multi-antenna communication system according to claim 1, wherein the third preamble sequence is a short preamble sequence.

4. The multi-pilot generation method in a multi-antenna communication system according to claim 2, wherein the long preamble sequence comprises a preamble sequence for channel estimation.

5. The multi-pilot generation method in a multi-antenna communication system according to claim 3, wherein the short preamble sequence comprises a preamble sequence for frequency offset elimination.

6. The multi-pilot generation method in a multi-antenna communication system according to claim 1, wherein the second preamble sequence is a result of multiplication of the first preamble sequence after serial-to-parallel conversion by the third preamble sequence after the serial-to-parallel conversion in a time domain.

7. The multi-pilot generation method in a multi-antenna communication system according to claim 1, wherein the second preamble sequence is a result of multiplication of the first preamble sequence after the serial-to-parallel conversion by the third preamble sequence after the serial-to-parallel conversion in the time domain and a frequency domain.

8. A multi-pilot detection method in a multi-antenna communication system, comprising the steps of:
receiving a first preamble sequence transmitted from a plurality of antennas and a second preamble sequence on which the first preamble sequence and a third preamble sequence are superimposed, at a plurality of antennas; and
separating the third preamble sequence from the second preamble sequence through space division processing.

9. The multi-pilot detection method in a multi-antenna communication system according to claim 8, wherein the first preamble sequence is a long preamble sequence.

10. The multi-pilot detection method in a multi-antenna communication system according to claim 8, wherein the third preamble sequence is a short preamble sequence.

11. The multi-pilot detection method in a multi-antenna communication system according to claim 9, wherein the long preamble sequence comprises a preamble sequence for channel estimation.

12. The multi-pilot detection method in a multi-antenna communication system according to claim 10, wherein the short preamble sequence comprises a preamble sequence for frequency offset elimination.

13. The multi-pilot detection method in a multi-antenna communication system according to claim 8, further comprising a step of performing channel estimation processing and frequency offset elimination processing using the first preamble sequence and the third preamble sequence.

* * * * *